United States Patent [19]

Nagasawa

[11] Patent Number: 5,224,353
[45] Date of Patent: Jul. 6, 1993

[54] CONTROL METHOD AND APPARATUS FOR AIR-CONDITIONER

[75] Inventor: Atsushi Nagasawa, Mishima, Japan

[73] Assignee: Kabushiki Kaisha Toshiba, Kawasaki, Japan

[21] Appl. No.: 906,368

[22] Filed: Jun. 30, 1992

[30] Foreign Application Priority Data

Sep. 30, 1991 [JP] Japan .................................. 3-252174

[51] Int. Cl.$^5$ ............................................. F25B 41/00
[52] U.S. Cl. ....................................... 62/209; 62/229; 236/51
[58] Field of Search ................. 236/51; 62/229, 228.4, 62/209

[56] References Cited

U.S. PATENT DOCUMENTS 5,135,045 8/1992 Moon .................. 236/51 X

FOREIGN PATENT DOCUMENTS 0113237 5/1988 Japan .................... 236/51

Primary Examiner—William E. Wayner
Attorney, Agent, or Firm—Foley & Lardner

[57] ABSTRACT

A detected temperature $T_m$ of the atmosphere of a remote controller is read in at a predetermined detection time interval. When a difference between a present or new detected temperature $T_m$ and a last or old detected temperature $T_{m(old)}$ is above a predetermined value, a first correction value corresponding to the temperature difference $(T_s - T_m)$ is added to a set temperature $T_s$ set in advance to thereby determine a set temperature $T_{sc}$. On the other hand, when a difference between a present or new detected temperature $T_m$ and a last or old detected temperature $T_{m(old)}$ is less than the predetermined value, a second correction value corresponding to the temperature difference $(T_s - T_m)$ is added to the last or old set temperature $T_{sc(old)}$ to thereby determine a corrected set temperature $T_{sc}$, thus to operate a compressor motor in dependency upon a difference between the corrected set temperature $T_{sc}$ and a detected temperature of a suction or inlet air.

12 Claims, 5 Drawing Sheets

CONTROL METHOD AND APPARATUS FOR AIR-CONDITIONER

TECHNICAL FIELD OF THE INVENTION

This invention relates a control method and a control apparatus for an air-conditioner, which is adapted to control the temperature of an ambient temperature in the vicinity of a remote controller placed on the side of an operator so as to become close to a set temperature.

PRIOR ART

Air-conditioners generally control temperature so that a suction or inlet temperature of air in a room becomes close to a set temperature. For this reason, a control method is employed to detect temperature of air in a room by using a temperature sensor provided in an indoor unit to assume that detected temperature as a representative value of a room temperature to adjust an operation speed of a compressor, or control operation/stop of the compressor so that the detected temperature becomes close to a set temperature. However, the temperature of an ambient round the human being present in a room where an air-conditioner is operated is ordinarily considerably different from a detected temperature by a temperature sensor provided in the indoor unit.

In order to avoid inconveniences resulting from the above, air-conditioners as disclosed in the Japanese Patent Laid Open Application (JP-A) No. 183333/1988 publication and/or the Japanese Patent Publication (JP-B) No. 6374/1989 have been already proposed. Namely, in these air-conditioners, attention is drawn to the fact that the position of the human being present in a room where an air-conditioner is operated and the position where the remote controller is placed are ordinarily substantially the same to carry out air-conditioning control on the basis of a detected temperature of a temperature sensor provided in the air-conditioner in consideration of a detected temperature of a temperature sensor provided in the remote controller in order to allow the temperation of an ambient atmosphere at the position where the human being is present to become close to a set temperature.

In the air-conditioners disclosed in these literatures, control is conducted such that a detected temperature of the temperature sensor provided in the remote controller resultantly becomes equal to a set temperature. However, in such air-conditioners, while there is particularly no problem in the case where a difference between a temperature of a suction or inlet air detected at the indoor unit and an ambient temperature in the vicinity of the remote controller detected by the remote controller is considerably large such as immediately after its operation is started, since in the case where the ambient temperature near the remote controller is in the vicinity with a set temperature, "hunting" phenomenon in control takes place, and there was the inconvenience that the ambient temperature is not stable even if a set temperature is fixed. It is considered that such inconvenience may be caused by a delay in response of a room temperature such that a temperature change of the entirety of the interior of a room delays with respect to a temperature change of a blowoff air from the indoor unit, or a response delay of a temperature sensor associated with the remote controller.

In either event, in the case of the conventional control methods for air-conditioners, there was the inconvenience that the stability of the ambient temperature near the remote controller is poor, resulting in insufficient comfortability.

SUMMARY OF THE INVENTION

An object of this invention is to provide a control method and a control apparatus for an air-conditioner, which permit the ambient temperature near the remote controller to become close to a set temperature in a stabilized manner.

To achieve the above object, a control method according to this invention comprises a first step of reading in, at a predetermined time interval, a detected temperature $T_m$ of the atmosphere near a remote controller; a second step of adding, when a difference between a present or new detected temperature $T_m$ and a last or old detected temperature $T_{m(old)}$ is above a predetermined value, a first correction value corresponding to a temperature difference $(T_s - T_m)$ to a set temperature $T_s$ set in advance to thereby determine a corrected set temperature $T_{sc}$, and of adding, when a difference between a present or new detected temperature $T_m$ and a last or old detected temperature $T_{m(old)}$ is less than the predetermined value, a second correction value corresponding to the temperature difference $(T_s - T_m)$ to a last or old set temperature $T_{sc(old)}$ to thereby obtain a corrected set temperature $T_{sc}$; and a third step of operating a compressor in dependency upon a difference between the corrected set temperature $T_{sc}$ and a detected temperature $T_a$ of a suction or inlet air.

Further, a control apparatus according to this invention comprises a remote controller and a main controller, the remote controller including temperature setting means for setting a set temperature $T_s$, temperature detection means for detecting an ambient temperature to output a detected temperature $T_m$ signal, mode selector means for selecting an operation mode to attach importance to the ambient temperature of the remote controller or an operation mode to attach importance to the ambient temperature of the main controller; and transmission means for transmitting, to the main controller, at a predetermined time interval, signals of the set temperature $T_s$ by the temperature setting means, the detected temperature $T_m$ from the temperature detection means, and an operation mode selected by the mode selector means, the main controller including signal receiving means adapted to receive the set temperature $T_s$ signal, the detected temperature $T_m$ signal, and the signal of a selected operation mode transmitted from the remote controller, temperature detection means for detecting a suction or inlet air from the interior of a room to output a detected temperature $T_a$ signal, and frequency command determination means adapted for reading in the detected temperature $T_m$ signal at a predetermined time interval, wherein when a difference between the present detected temperature $T_m$ and the last detected temperature $T_{m(old)}$ is more than a predetermined value, the frequency command determination means is operative to add a first correction value corresponding to a temperature difference $(T_s - T_m)$ to the set temperature $T_s$ to thereby determine a corrected set temperature $T_{sc}$, while when a difference between the present detected temperature $T_m$ and the earlier detected temperature $T_{m(old)}$ is less than the predetermined value, the frequency command determination means is operative to add a second correction value corresponding to the temperature difference ($T_s - T_m$) to the last set temperature $T_{sc(old)}$ to thereby obtain a corrected set temperature $T_{sc}$, to thus determine an operation frequency f of the compressor in dependency upon a difference between the corrected set temperature $T_{sc}$ and the detected temperature $T_a$ of the suction or inlet air.

In this invention, since the set temperature is corrected in dependency upon a difference between the detected temperature $T_m$ at the remote controller and the set temperature $T_s$, there is no possibility that the set temperature is varied by any change of the detected temperature $T_a$ of the main controller. Further, in the case where a change in the detected temperature at the remote controller is small, an approach is employed to alter the set temperature by a smaller change with the last set temperature $T_{sc}$ as a reference, thereby making it possible to stably maintain the detected temperature $T_m$ of the remote controller at a value in the vicinity of the set temperature $T_s$.

EMBODIMENT

This invention will now be described in more detail with reference to the attached drawings.

Figure 1A:
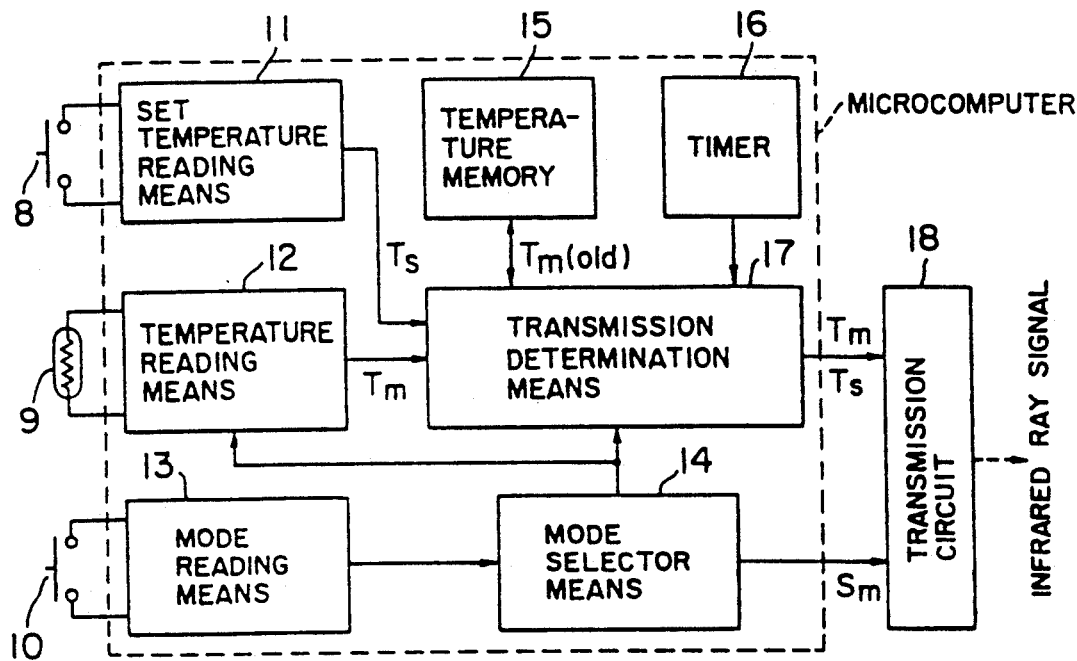
FIGS. 1(A) and (B) are block diagrams showing a remote controller and a main controller of a control apparatus according to this invention, respectively.

FIGS. 1(A) and (B) are block diagrams showing the configuration of the entirety of an embodiment according to this invention wherein (A) and (B) respectively indicate a remote controller and a main controller, and respective functional sections encompassed by broken lines are executed by a microcomputer.

The remote controller shown in FIG. 1(A) includes, at the input terminal thereof, a temperature setting key 8, a temperature sensor 9, and a mode selecting switch 10. The temperature setting key 8 sets an air-conditioning target or objective temperature to output it as a set temperature $T_s$ signal. The temperature sensor 9 detects temperature of an atmosphere around the remote controller to output a detected temperature $T_m$ signal. The mode selecting switch 10 is used for carrying out selection of an operation mode (second operation mode) to attach importance to the ambient temperature of the remote controller (not temperature of the suction or inlet air) to effect a control such that the ambient temperature of the remote controller becomes close to a set temperature from an ordinary operation mode (first operation mode) to effect a control such that the temperature of the suction or inlet air of the indoor unit becomes close to a set temperature, or to release such selected second operation mode to return to the first operation mode. On the basis of the operation state of the temperature setting key 8, the set temperature $T_s$ is read by the set temperature reading means 11. On the basis of an output of the temperature sensor 9, the detected temperature $T_m$ is read by the temperature reading means 12. In addition, on the basis of the operation state of the mode selecting switch 10, a selected or designated operation mode is read by the mode reading means 13.

When the fact that the present operation mode is the second operation mode, i.e., the operation mode to attach importance on the remote controller ambient temperature is read by the mode reading means 13, mode selector means 14 generates a mode select signal $S_m$ to attach importance on the remote controller ambient temperature to deliver it to the temperature reading means 12, transmission determination means 17, and a transmission circuit 18. Only when this mode select signal $S_m$ is given, the temperature reading means 12 reads in the detected temperature $T_m$ from the temperature sensor 9. However, in the first operation mode, i.e., the so-called ordinary mode which is not the mode to attach importance on the remote controller ambient temperature, reading in of the detected temperature $T_m$ is not carried out. When a mode select signal $S_m$ is given, the transmission determination means 17 delivers the set temperature $T_s$ and the detected temperature $T_m$ to the transmission circuit 18. In the ordinary mode, the transmission determination means 17 delivers only the set temperature $T_s$ to the transmission circuit 18. Namely, in the second operation mode, the transmission circuit 18 transmits the mode select signal $S_m$, the set temperature $T_s$, and the detected temperature $T_m$ to the main controller (see FIG. 1(B) through an infrared signal. On the other hand, in the first operation mode, the transmission circuit 18 transmits only the set temperature $T_s$ to the main controller through an infrared ray signal.

When the control apparatus is in the second operation mode, every time the transmission determination means 17 sends data of the detected temperature $T_m$ to the transmission circuit 18, this detected temperature $T_m$ is stored into a temperature memory 15. Simultaneously with this, a timer 16 starts. The transmission determination means 17 makes a comparison between the present or new detected temperature $T_m$ read at a predetermined time interval, e.g., at a time interval of 15 seconds and the last or old detected temperature $T_{m(old)}$ stored in the temperature memory 15. As a result, if that difference is above a predetermined value, e.g., about 1.5° to 2.5° C., particularly above 2° C., the transmission determination means 17 sends out, at the time point when that difference exceeds such a predetermined value, to the transmission circuit 18, the present detected temperature $T_m$ as a signal indicative of the detected temperature $T_m$ to be outputted from the remote controller. In contrast, if that difference is below 2° C., the transmission determination means 17 sends out, after a set time (e.g., 10 minutes) of the timer means 16 has passed, the present detected temperature $T_m$.

It is to be noted that while when the control apparatus is in the first operation mode, data of the set temperature $T_s$ is transmitted from the transmission circuit 18 of the remote controller to the main controller through infrared rays, various methods of handling signals used therefor are already proposed, and are known.

Figure 1B:
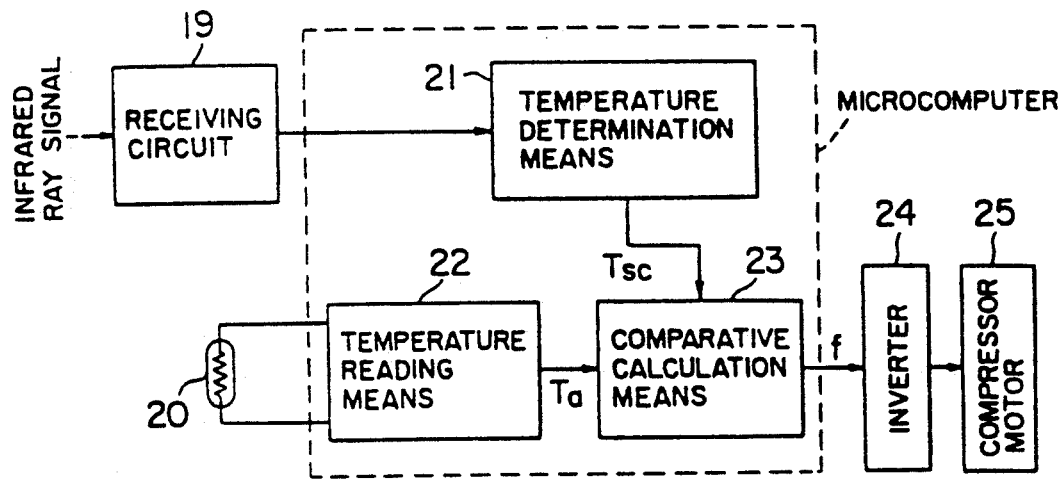

The main controller shown in FIG. 1(B) includes a receiving circuit 19 adapted to receive an infrared ray signal from the remote controller (FIG. 1(A)), and a temperature sensor 20 for detecting temperature of a suction or inlet air. When the receiving circuit 19 receives signals indicative of the mode select signal $S_m$, the detected temperature $T_m$ and the set temperature $T_s$, temperature determination means 21 corrects the set temperature $T_s$ in dependency upon a difference between the detected temperature $T_m$ and the set temperature $T_s$ to determine a new set temperature $T_{sc}$. Further, the detected temperature $T_a$ of the temperature sensor 20 is read by temperature reading means 22. In addition, comparative calculation means 23 determines a power supply frequency command f given to a compressor motor (which will be referred to soon) of the air-conditioner in accordance with the relationship between the temperature difference $(T_a - T_{sc})$ and the frequency f shown in FIGS. 4(A) and (B), for example, in dependency upon a difference $(T_a - T_{sc})$ between the new set temperature $T_{sc}$ and the detected temperature $T_a$ of the suction or inlet air to deliver it to an inverter 24. The inverter 24 outputs an a.c. of a frequency corresponding to that frequency command to drive a compressor motor 25.

The method of determining a new set temperature $T_{sc}$ by the temperature determination means 21 will now be described. First, when the control apparatus is in the second mode, an approach is employed to modify or correct a set temperature $T_s$ set by the remote controller operation by using a detected temperature $T_m$ first received after the control is started in accordance with the following equation (1), thus to determine a new set temperature $T_{sc}$:

$$T_{sc} = T_s + (T_s - T_m)/\alpha \quad (1)$$

The temperature determination means 21 carries out the calculation of the equation (1) thereafter to apply this set temperature $T_{sc}$ to the comparative calculation means 23, and to assume the detected temperature $T_m$ used in that calculation as the last or Old detection temperature $T_{m(old)}$ and to assume the computed result as the last or old set temperature $T_{sc(old)}$, to thus store them thereinto. The coefficient $\alpha$ of the second term of the right side in the equation (1) is suitably selected from the range of about 1.5 to 4.0, and for example, $\alpha$ is equal to 2.

In the case where a signal indicative of the detected temperature $T_m$ is received at the second time or more in the receiving circuit 19, whether or not a difference between the present or new detection signal $T_m$ and the last or old detection signal $T_{m(old)}$ is smaller than 2° C. is examined. Namely, whether or not the following equation holds is examined.

$$|T_m - T_{m(old)}| < 2 \quad (2)$$

If the above equation (2) does not hold and a temperature difference is more than 2° C., a new set temperature $T_{sc}$ is determined by carrying out the calculation of the above equation (2) for a second time to repeat similar operations such as outputting and storing, etc.

In contrast, in the case where the above equation (2) holds, and the temperature difference is smaller than 2° C., a new set temperature $T_{sc}$ is calculated by the following equation with a view to correcting the last or old set temperature $T_{sc(old)}$.

$$T_{sc} = T_{sc(old)} + (T_s - T_m)/\beta \quad (3)$$

Also in the case where a new set temperature $T_{sc}$ is determined by the above equation (3), similar operations are carried out in connection with outputting and storing, etc. in the same manner as described above. The coefficient $\beta$ of the second term of the right side in the above equation (3) is suitably selected from the range of about 1.5 to 4.0 under the condition of $\beta > \alpha$. For example, $\beta$ is equal to 4. Explanation will now be given by taking examples where $\alpha$ is equal to 2, and $\beta$ is equal to 4.

Figure 2:
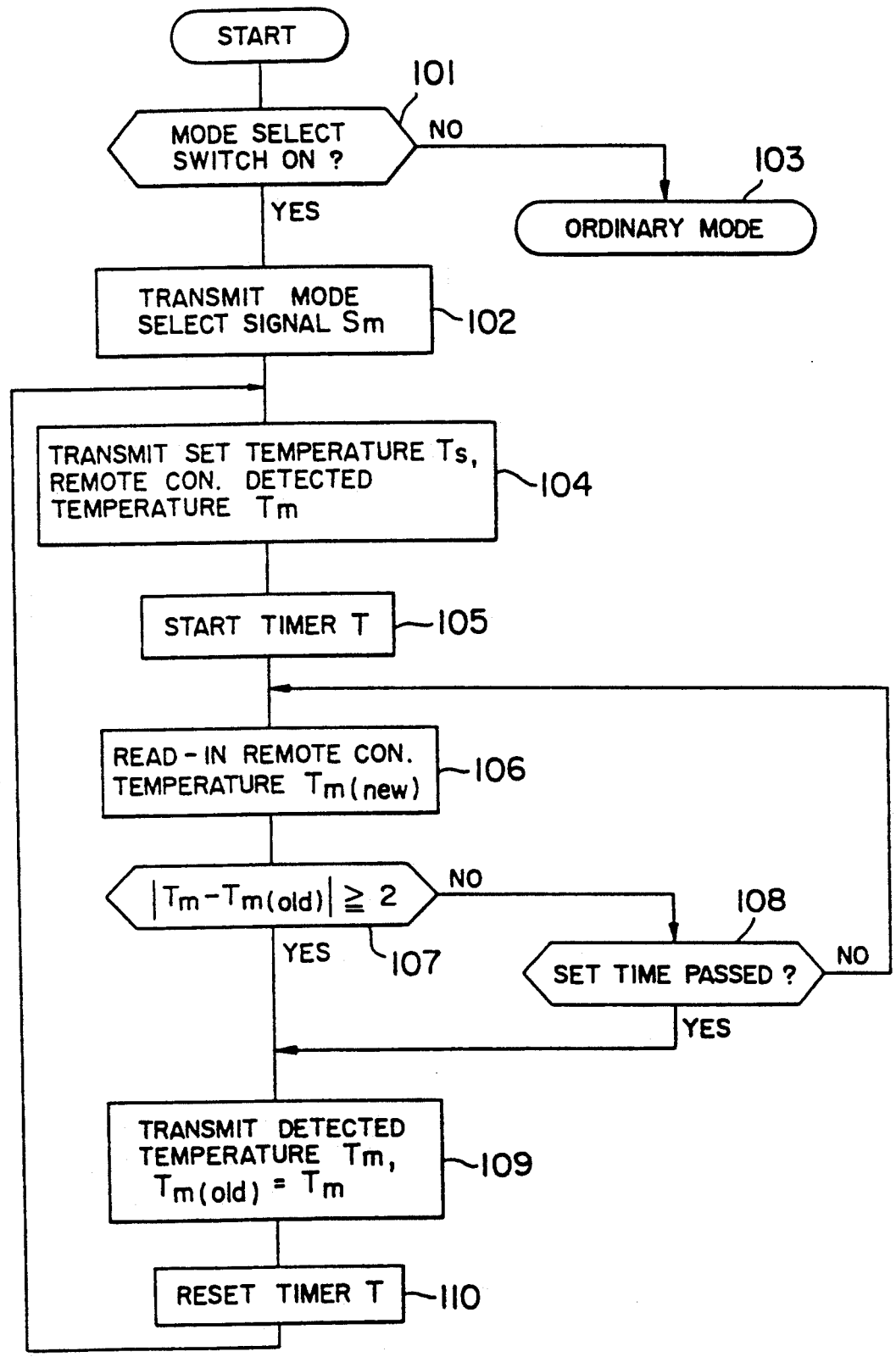
FIG. 2 is a flowchart showing the processing procedure in the case of executing a main function of the remote controller by using a microcomputer.

The main functions (sections encompassed by broken lines in FIG. 1(A)) in the remote controller are executed in accordance with the flowchart of FIG. 2 by the microcomputer. At step 101, whether the mode selecting switch 10 is in an ON or OFF state is judged. As a result, when the mode selecting switch 10 is judged to be in ON state, the second mode is judged to be set to transmit a mode select signal $S_m$ at step 102. In contrast, when the mode selecting switch 10 is judged to be in OFF state, the first operation mode is judged to be set to execute the processing of the well known ordinary operation mode at step 103. Further, in the case where the mode select signal $S_m$ is being transmitted, respective signals of the set temperature $T_s$ set by the temperature setting key 8 and the detected temperature $T_m$ detected by the temperature sensor 9 are transmitted at step 104. At the next step 105, a timer set to, e.g., 10 minutes is started. Subsequently, at step 106, the detected temperature $T_m$ is read in. Further, at step 107, comparison between the present or new detection temperature $T_m$ and the last or old detection temperature $T_{m(old)}$ stored in the temperature memory 15 is made. As a result, if that difference is more than 2° C., the present or new detected temperature Tm is transmitted to the main controller and stored as the old detection temperature $T_{m(old)}$ at the next step 109. In contrast, if that difference is smaller than 2° C., whether or not a set time of the timer T has passed is confirmed at step 108. Upon confirmation, the operation shifts to the processing at the step 109. Then, the timer T is reset at the step 110 to repeatedly execute the processing at the step 104 and those subsequent thereto.

Figure 3:
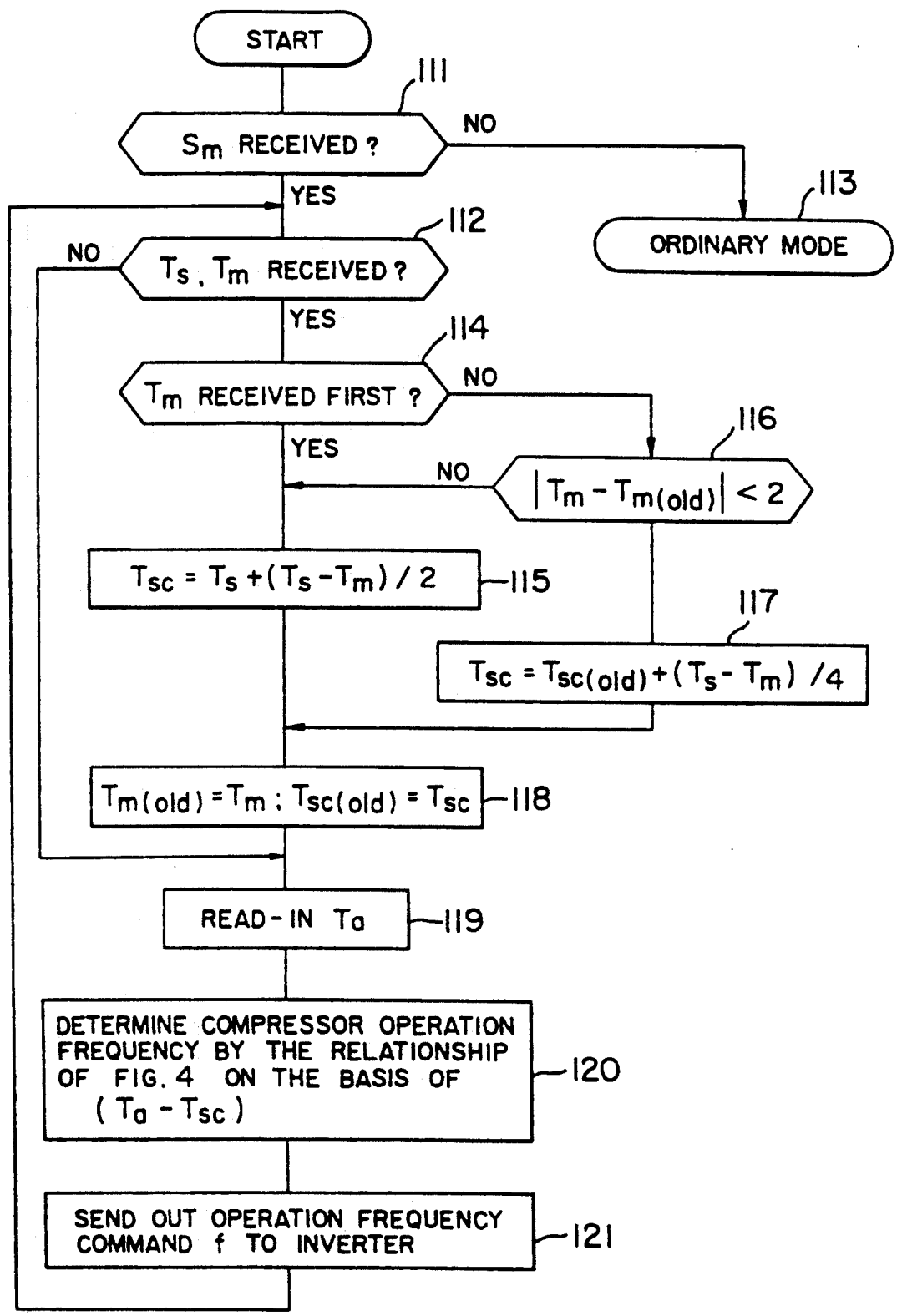
FIG. 3 is a flowchart showing the processing procedure in the case of executing a main function of the main controller by using the microcomputer, FIGS. 4(A) and (B) shows the relationship between the temperature difference and the frequency in the case of determining a power supply frequency at which the compressor motor is operated by the main controller.

The microcomputer which governs the main functions (the sections encompassed by broken lines of FIG. 1(B)) in the main controller executes the processing in accordance with the flowchart of FIG. 3. In this case, at step 111, whether or not a mode select signal $S_m$ is received is judged. As a result, if that mode select signal $S_m$ is received, respective signals of the set temperature $T_s$ and the detected temperature $T_m$ are subsequently received at step 112. In contrast, if that mode select signal $S_m$ is not received, the operation of the first operation mode is executed at step 113. Further, after respective signals of the set temperature $T_s$ and the detected temperature $T_m$ are received, whether or not the received signal of the detected temperature $T_m$ is a signal first received is judged at the step 114. As a result, if that signal is judged to be a signal first received, the calculation of the equation (1) is executed at step 115. On the other hand, if that signal is judged to be a signal received at the second time or more, whether or not the equation (2) holds is judged at step 116. In the case where the equation (2) does not hold, namely, if a difference between the present or new detected temperature $T_m$ and the last or old detected temperature $T_{m(old)}$ is more than 2° C., the calculation of the equation (1) is executed at step 115. In contrast, in the case where the equation (2) holds at the step 115, namely, a difference between the present or new detected temperature $T_m$ and the last or old detected temperature $T_{m(old)}$ is less than 2° C., the calculation of the equation (3) is executed at step 117. At the next step 118, the received detection temperature $T_m$ and the set temperature $T_{sc}$ obtained by calculation are respectively stored to stand by the next calculation.

Figure 4A:
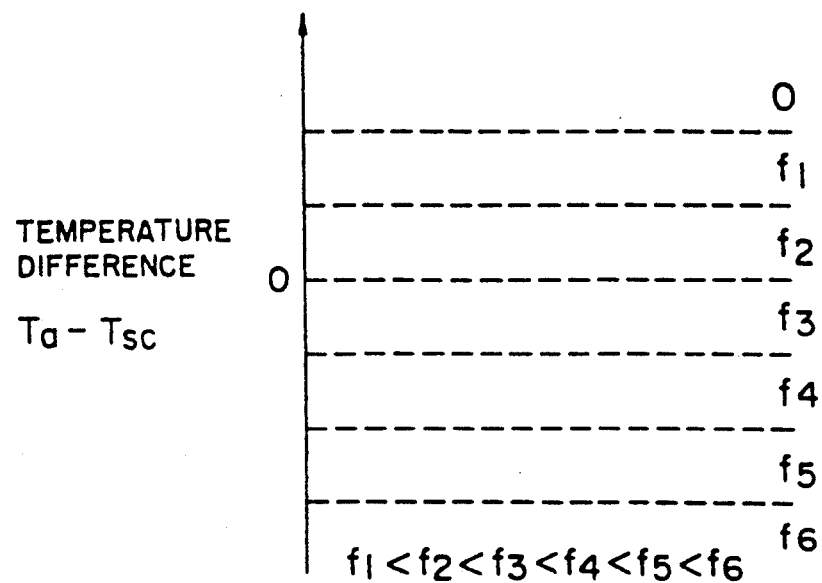
Figure 4B:
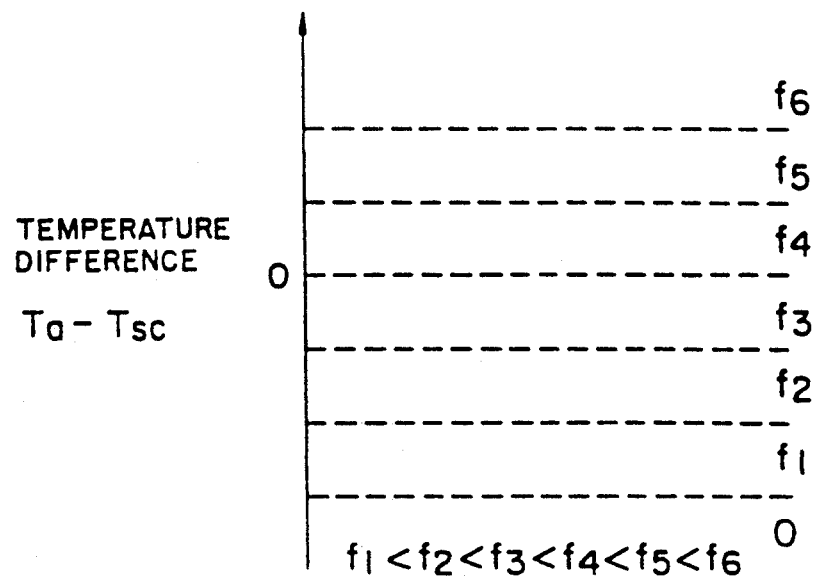

Subsequently, the detected temperature $T_a$ from the temperature sensor 20 is read at step 119. At step 120, a temperature difference $(T_a - T_{sc})$ is determined or calculated. Further, as shown in FIG. 4(A) (heating operation) and FIG. 4(B) (cooling operation), a change range of the temperature difference $(T_a - T_{sc})$ is divided into a plurality of regions to determine an operation frequency to be instructed among frequency values $0, f_1, f_2, \ldots, f_5, f_6$ allocated to the respective regions in dependency upon to which region that temperature difference belongs, thus to send out it as an operation frequency command f to the inverter 24 at step 121. Thus, the inverter 24 drives the compressor at a rotational speed corresponding to the operation frequency command f.

Figure 5:
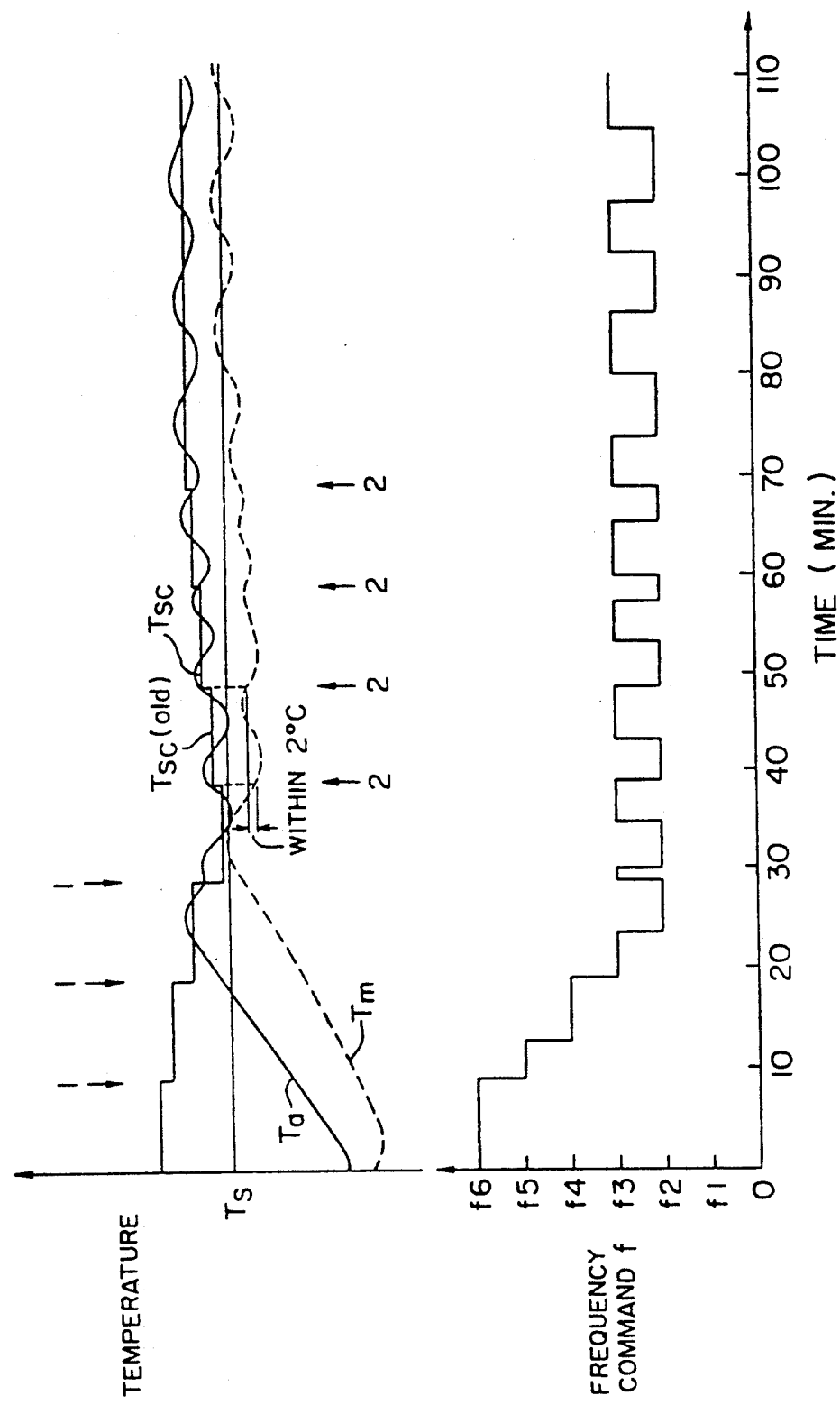
FIG. 5 is a diagram showing the relationship of temperature, frequency and time for the purpose of explaining the air-conditioning operation when the control according to this invention is carried out.

FIG. 5 shows, in connection with the heating operation, changes of the detected temperature $T_m$ of the atmosphere near the remote controller, the detected temperature $T_a$ of the suction or inlet air of the indoor unit, and the new set temperature $T_{sc}$, the set temperature $T_s$ and a change of the operation frequency command f corresponding to the detection temperature difference $(T_a - T_{sc})$ in the case where the above-described processing is executed. As apparent from this figure, when a change per 10 minutes of the detected temperature $T_m$ is more than 2° C., i.e., at respective time points indicated by (1), correction is implemented to the set temperature $T_s$ by $(T_s - T_m)/2$. On the other hand, when a change of the detected temperature $T_m$ is smaller than 2° C., i.e., at respective time points indicated by (2), correction is implemented to the last or old set temperature $T_{sc(old)}$ by $(T_a - T_m)/4$.

As a result, even if the detected temperature $T_a$ of the suction or inlet air of the indoor unit relatively greatly varies, it is possible to hold the change of the detected temperature $T_m$ of the atmosphere near the remote controller, i.e., the temperature near the place where the human being is present down to a small value, and to stably maintain the detected temperature $T_m$ so that it is equal to a value in the vicinity with the temperature set value $T_s$.

Further, it is not required to unnecessarily change the frequency of an a.c. voltage applied to the compressor motor as in the conventional apparatus.

It is to be noted that while, in the above-described embodiment, explanation has been given in connection with the case where the air-conditioner is operated in the heating operation mode, similar control may be conducted also at the time of the cooling operation. In this case, it should be noted that since the temperature of the atmosphere near the remote controller at the time of cooling operation responds faster than that at the time of heating operation, if there is only adopted a method of carrying out corrections of the set temperature $T_{sc}$ at respective time points indicated by (2) every other time with respect to transmission of a temperature signal from the remote controller, considerable effect can be attained.

In addition, while, in the above-described embodiment, explanation has been given in connection with an air-conditioner adapted to vary an operation frequency of the compressor motor corresponding to the detected temperature difference $(T_a - T_{sc})$, this invention is not considered to be applied only to such an implementation in a limitative manner, but it is a matter of course that this invention may be applied to an air-conditioner adapted to control operation/stop of the compressor motor in dependency upon the detected temperature difference $(T_a - T_{sc})$.

What is claimed is:

1. A control method for an air-conditioner, comprising:
   a first step of reading in, at a predetermined detection time interval, a detected temperature $T_m$ of the atmosphere near a remote controller;
   a second step of adding, when a difference between a present or new detected temperature $T_m$ and a last or old detected temperature $T_{m(old)}$ is more than a predetermined value, a first correction value corresponding to a temperature difference $(T_s - T_m)$ to a set temperature $T_s$ set in advance to thereby obtain a corrected set temperature $T_{sc}$, and of adding, when a difference between a present or new detected temperature $T_m$ and a last or old detected temperature $T_{m(old)}$ is less than said predetermined value, a second correction value corresponding to a temperature difference $(T_s - T_m)$ to a last or old set temperature $T_{sc(old)}$ to thereby obtain a corrected set temperature $T_{sc}$; and
   a third step of operating a compressor in dependency upon a difference between said corrected set temperature $T_{sc}$ and a detected temperature $T_a$ of a suction or inlet air.

2. A control method as set forth in claim 1, wherein when a difference between a present or new detected temperature $T_m$ and a last or old detected temperature $T_{m(old)}$ is more than a predetermined value at said second step, said detected temperature $T_m$ is updated every said detection time interval, while when a difference between a present or new detected temperature $T_m$ and a last or old detected temperature $T_{m(old)}$ is less than said predetermined value, said detected temperature $T_m$ is updated after a timer set time longer than said detection time interval has passed.

3. A control method as set forth in claim 2, wherein said detection time interval at said second step is 10 to 20 seconds, preferably 15 seconds, and said timer set time is 5 to 20 minutes, preferably 10 minutes.

4. A control method as set forth in claim 1, wherein said first and second correction values at said second step are obtained by multiplying said temperature difference $(T_s - T_m)$ by first and second coefficients smaller than 1, respectively.

5. A control method as set forth in claim 4, wherein said first coefficient is 1/(1.5 to 4.0), preferably ½, and said second coefficient is 1/(1.5 to 4.0), preferably ¼.

6. A control method as set forth in claim 1, wherein said predetermined value relating to a difference between a present or new detected temperature $T_m$ and a last or old detected temperature $T_{m(old)}$ at said second step is 1.5° to 2.5° C., especially 2° C.

7. A control apparatus for an air-conditioner comprising a remote controller and a main controller,
   said remote controller including:
   temperature setting means for setting a set temperature $T_s$, temperature detection means for detecting an ambient temperature to output a detected temperature $T_m$ signal, mode selector means for selecting an operation mode to attach importance to the ambient temperature of said remote controller or an operation mode to attach importance to the ambient temperature of said main controller, and transmission means for transmitting, to said main controller, at a predetermined detection time interval, signals of the set temperature $T_s$ by said temperature setting means, the detected temperature $T_m$ from said temperature detection means, and an operation mode selected by said mode selector means, said main controller including:

receiving means adapted to receive the set temperature $T_s$ signal, the detected temperature $T_m$ signal, and the operation mode signal transmitted from said remote controller, temperature detection means for detecting temperature of a suction or inlet air from the interior of a room to output a detected temperature $T_a$ signal, and frequency command determination means adapted for reading in said detected temperature $T_m$ signal at a predetermined time interval wherein when a difference between a present or new detected temperature $T_m$ and a last or old detected temperature $T_{m(old)}$ is more than a predetermined value, said frequency command determination means adds a first correction value corresponding to a temperature difference $(T_s - T_m)$ to said set temperature $T_s$ to thereby obtain a corrected set temperature $T_{sc}$, while when a difference between a present or new detected temperature $T_m$ and a last or old detected temperature $T_{m(old)}$ is less than said predetermined value, said frequency command determination means adds a second correction value corresponding to the temperature difference $(T_s - T_m)$ to the last or old set temperature $T_{sc(old)}$ to thereby obtain a corrected set temperature $T_{sc}$, thus to determine an Operation frequency f of a compressor in dependency upon a difference between said corrected set temperature $T_{sc}$ and the detected temperature $T_a$ of a suction or inlet air.

8. A control apparatus as set forth in claim 7, wherein said frequency command determination means updates the detected temperature $T_m$ at said detection time interval when a difference between a present or new detected temperature $T_m$ and a last or old detected temperature $T_{m(old)}$ is more than a predetermined value, and updates the detected temperature $T_m$ after a timer set time longer than said detection time interval has passed when a difference between a present or new detected temperature $T_m$ and a last or old detected temperature $T_{m(old)}$ is less than said predetermined value.

9. A control apparatus as set forth in claim 7, wherein said detection time interval in said temperature detection means is 10 to 20 seconds, preferably 15 seconds, and said timer set time is 5 to 20 minutes, preferably 10 minutes.

10. A control apparatus as set forth in claim 7, wherein said first and second correction values in said frequency command determination means are obtained by multiplying said temperature difference $(T_s - T_m)$ by first and second coefficients smaller than 1, respectively.

11. A control apparatus as set forth in claim 10, wherein said first coefficient in said frequency command determination means is 1/(1.5 to 4.0), preferably ½, and said second coefficient is 1/(1.5 to 4.0), preferably ¼.

12. A control apparatus as set forth in claim 7, wherein said predetermined value relating to a difference between a present or new detected temperature $T_m$ and a last or old detected temperature $T_{m(old)}$ in said frequency command determination means is 1.5° to 2.5° C., especially 2° C.

* * * * *